Patented Mar. 13, 1951

2,545,176

UNITED STATES PATENT OFFICE 2,545,176

FUNGICIDAL COMPOSITIONS COMPRISING N,N'-BIS(4-NITROSOPHENYL) PIPERAZINE

Miller W. Swaney and Samuel B. Lippincott, Westfield, N. J., assignors to Standard Oil Development Company, a corporation of Delaware No Drawing. Application May 11, 1948,
Serial No. 26,473

5 Claims. (Cl. 167—33)

This invention relates to new and useful improvements in parasiticidal preparations, and more particularly to improved fungicidal compositions. This invention also relates to methods of protecting organic material subject to attack by low orders of organisms.

It has now been found that N,N'-bis(4-nitrosophenyl) piperazine is an extremely effective fungicide.

N,N'-bis(4-nitrosophenyl) piperazine may be prepared in a variety of ways (Ber. 12, 1795 (1879)). One of the methods of preparation is to treat diphenylpiperazine with nitrous acid.

N,N'-bis(4-nitrosophenyl) piperazine,

is a green solid that softens at about 120° C. and melts to a black tar at about 143° C. with decomposition.

Regardless of the method of preparation, N,N'-bis(4-nitrosophenyl) piperazine has outstanding fungicidal properties. Compositions containing N,N'-bis(4-nitrosophenyl) piperazine may be applied to parent materials to rid them of harmful organisms or to prevent fungus growth and mildew formation. Since these compositions are exceptionally non-phytotoxic they may be applied safely to a wide variety of plants. Some of the additional parent materials to which they may be applied for protective purposes are leather, wood, fur, wool, coated fabrics and other substances, even including animal bodies.

N,N'-bis(4-nitrosophenyl) piperazine may be best applied as a diluted dust mixed with a solid carrier such as clay, talc and bentonite. It may also be applied as a spray in a liquid carrier, either as a solution in a solvent as for example acetone, or as a suspension in a non-solvent such as water. When applied as a spray in water, it may be desirable to incorporate a wetting agent.

The water-soluble wetting agents that may be used comprise the sulfates of long chain alcohols such as dodecanol up to octadecanol, sulfonated amide and ester derivatives, sulfonated aromatic and mixed alkyl-aryl sulfonate derivatives, esters of fatty acids such as ricinoleic acid ester of sorbitol, and petroleum sulfonates of $C_{10}$ to $C_{20}$ length. The non-ionic emulsifying agents such as the ethylene oxide condensation products of alkylated phenols may also be used. It is to be understood that these and similar compounds are intended when the term wetting agent is used hereinafter.

N,N'-bis(4-nitrosophenyl) piperazine may also be admixed with carriers that are themselves active, such as other parasiticides, hormones, herbicides, fertilizers and wetting agents. Stomach and contact insecticides such as the arsenates, fluorides, rotenone and the various fish poisons and organic insecticides, such as 1,1-di-(p-chlorophenyl) trichlorethane, benzene - hexachloride and similar products may also be advantageously added.

An example of the use of the compound of this invention for the stated purposes is illustrated in the following paragraph:

Example

The slide germination technique for fungicidal testing was carried out as described by Wellman and McCallan (Contributions of Boyce Thompson Institute, vol. 13, No. 3, pages 171–176). Against both *Alternaria solani* and *Sclerotinia fructicola*, the fungicidal inhibiting concentration of N,N'-bis(4-nitrosophenyl) piperazine was less than 0.001% which shows that it is as active as, if not more active than, copper compounds such as Bordeaux mixture and other metallic fungicides. Concentrations shown are those that permitted only 50% germination of spores.

The compositions of this invention are especially useful on plants that do not tolerate copper and mercury and other metal salts.

What is claimed is:

1. A fungicidal composition comprising N,N'-bis(4-nitrosophenyl) piperazine as the active ingredient admixed with a surface active dispersing agent which lowers the surface tension of water and thereby promotes aqueous colloidal dispersions of the N,N'-bis(4-nitrosophenyl) piperazine.

2. A fungicidal dust composition comprising N,N'-bis(4-nitrosophenyl) piperazine as the active ingredient admixed with a powdered clay.

3. A fungicidal dust composition as in claim 2 in which the clay is bentonite.

4. A composition as in claim 1 in which the dispersing agent is a water-soluble dispersing agent selected from the group consisting of long-chain alcohol sulfates, sulfonated amide derivatives, sulfonated ester derivatives, sulfonated aromatic derivatives, sulfonated alkyl-aryl derivatives, and petroleum sulfonates of $C_{10}$ to $C_{20}$ length.

5. A fungicidal aqueous colloidal dispersion comprising in combination N,N'-bis(4-nitrosophenyl) piperazine, water, and a minor proportion of a dispersing agent which lowers the surface tension of water.

MILLER W. SWANEY.
SAMUEL B. LIPPINCOTT.

REFERENCES CITED

The following references are of record in the file of this patent:

UNITED STATES PATENTS

| Number | Name | Date |
|---|---|---|
| 2,329,074 | Muller | Sept. 7, 1943 |

OTHER REFERENCES

Morley: Berichte 12, 1795 (1879).

Swingle et al.: Chem. Abstracts, vol. 39, p. 1728 (1945).

Ginsburg et al.: J. Econ. Ent., vol. 29, No. 5, pages 856–859, Oct. 1936.